United States Patent
Autenrieth et al.

(10) Patent No.: US 6,294,149 B1
(45) Date of Patent: Sep. 25, 2001

(54) PROCESS FOR OPERATING A WATER VAPOR REFORMING SYSTEM, A REFORMING SYSTEM OPERABLE THEREBY AND A FUEL CELL SYSTEM OPERATING PROCESS

(75) Inventors: Rainer Autenrieth, Erbach; Stefan Boneberg, Blaustein; Thomas Poschmann; Martin Schuebler, both of Ulm; Steffen Wieland, Stuttgart, all of (DE)

(73) Assignee: Xcellsis GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 09/212,290

(22) Filed: Dec. 16, 1998

(30) Foreign Application Priority Data

Dec. 16, 1997 (DE) .............................. 197 55 813

(51) Int. Cl.$^7$ .............................. C01B 3/02; C01B 3/24; C01B 3/26
(52) U.S. Cl. ................ 423/648.1; 423/650; 423/652; 429/17
(58) Field of Search ................ 429/17, 19; 423/652, 423/648.1, 650; 422/197, 198; 48/127.1, 127.3, 127.7, 127.9

(56) References Cited

U.S. PATENT DOCUMENTS

| | | |
|---|---|---|
| 4,820,594 | 4/1989 | Sugita et al. . |
| 5,110,559 | 5/1992 | Kondo et al. . |
| 5,248,566 | 9/1993 | Kumar et al. . |
| 5,674,301 | 10/1997 | Sakai . |
| 5,897,970 * | 4/1999 | Isomura et al. .......................... 429/9 |
| 6,063,515 * | 5/2000 | Epp et al. .............................. 429/17 |

FOREIGN PATENT DOCUMENTS

| | | |
|---|---|---|
| 44 23 587 A1 1DE4423587/ | 1/1996 | (DE) . |
| PN | 11/1996 | (DE) . |
| 1417757 | 9/1966 | (FR) . |
| 1417758 | 9/1966 | (FR) . |
| 02011827 | 1/1990 | (JP) . |
| 2-160602 (A) | 6/1990 | (JP) . |
| 3-218902 (A) | 9/1991 | (JP) . |
| 4-160003 (A) | 6/1992 | (JP) . |
| 4-321502 (A) | 11/1992 | (JP) . |
| 4-338101 (A) | 11/1992 | (JP) . |
| 40703 * | 2/1994 | (JP) . |
| 06108625 | 5/1994 | (JP) . |

* cited by examiner

Primary Examiner—Wayne Langel
(74) Attorney, Agent, or Firm—Crowell & Moring LLP

(57) ABSTRACT

The invention relates to a process for operating a system for the water vapor reforming of a hydrocarbon. The system includes a reactor which is suitable for POX operation as well as for a reforming operation, an evaporator, a hydrogen separating stage, and a catalytic burner device. A first part of the catalytic burner device is in thermal contact with the reforming reactor, and a second part of the burner device is in thermal contact with the evaporator. An air/hydrocarbon intermediate feeding pipe for the reactor and a pressure maintaining valve are provided for changing the reactor between the POX operation and the reforming operation. According to the process, during cold start of the system, a heating operation is carried out during which the reactor is first used in the POX operation at a lower pressure and subsequently is used for the reforming operation and simultaneously the pressure is increased to the normal operating pressure. The invention is particularly useful for the water vapor reforming of methanol for obtaining hydrogen for a fuel-cell-operated motor vehicle.

9 Claims, 1 Drawing Sheet

PROCESS FOR OPERATING A WATER VAPOR REFORMING SYSTEM, A REFORMING SYSTEM OPERABLE THEREBY AND A FUEL CELL SYSTEM OPERATING PROCESS

BACKGROUND AND SUMMARY OF THE INVENTION

This application claims the priority of 197 55 813.5, filed Dec. 16, 1997, the disclosure of which is expressly incorporated by reference herein.

The invention relates to a process for operating a system for the water vapor reforming of a hydrocarbon and to a reforming system which can be operated according to this process. The invention particularly relates to a process for operating a mobile system for the water vapor reforming of methanol in a fuel-cell-operated motor vehicle for providing the hydrogen required for the fuel cells and to a system which can be operated in this manner, as well as to an operating process of a corresponding fuel cell system. For reasons of simplicity, the term "hydrocarbon", in addition to the actual hydrocarbons, will also include their derivatives, such as methanol.

In water vapor process for reforming hydrocarbons, a hydrogen separating stage having a selectively hydrogen permeable membrane separates the hydrogen generated by the reforming reaction in the warmed-up operation from the other constituents of the formed reformate gas. In addition to alternative methods, such as the CO conversion to carbon dioxide by way of a CO oxidation or the so-called CO shift reaction, this represents a method for obtaining a product gas which essentially consists of hydrogen, in which the CO concentration does not exceed a defined low threshold value. This is important, for example, when the product gas is used as the anode gas of a fuel cell system because the carbon monoxide acts as a catalyst poison. The hydrogen separating stage can be connected as a separate unit to the reforming reactor or can be integrated in the reforming reactor.

As known, the water vapor reforming reaction for reforming a hydrocarbon or hydrocarbon derivative, such as methanol, takes place endothermally and at a reaction temperature which is higher than the room temperature. During a cold start of such a system, the water vapor reforming reaction does not immediately provide hydrogen. The system components must first be brought to a corresponding heated operating temperature. However, particularly when the systems are used in motor vehicles, it is desirable to have driving power by the fuel cells available as soon as possible after the triggering of a starting operation of the vehicle and thus also of the reforming system. This requires, in turn, that the reforming system be capable of providing hydrogen as quickly as possible, at as low a cost as possible. Various special measures for the cold start of reforming systems have been suggested for this purpose.

It is known from French Patent Documents FR 1.417.757 and FR 1.417.758 to introduce during a cold start of a water vapor reforming system for methanol first a mixture of methanol and an oxidant into the reforming reactor in order to carry out a corresponding combustion reaction and thus heat the reactor. The oxidant feed is then terminated. The methanol/water vapor mixture to be reformed is fed and the water vapor reforming reaction is started. In the case of the system of French Patent Document FR 1.417.757, a heating space is in thermal contact with the reforming reaction space. In the heating space, residual gas from the reaction space which is not diffused through a separating membrane is non-catalytically burned with oxygen. An analogous measure is described in Japanese Published Patent Application JP 4-321502 (A).

German Patent Document DE 44 23 587 C2, discloses obtaining hydrogen optionally by means of an exothermal partial oxidation and/or an endothermal water vapor reforming of methanol in a reforming reactor filled with a suitable catalyst material, such as a Cu/ZnO material, depending on the control of the feeding of the individual reaction partners into the reactor and the temperature existing there. When the process is carried out appropriately, the two reactions will take place in parallel, in which case an autothermal reaction course can be set.

It is also known to use the anode-side exhaust gas of a fuel cell system fed with hydrogen by a reforming system directly or after an intermediate storage for heating the reforming reactor. See, for example, Japanese Published Patent Applications JP 4-338101 (A), JP 4-160003 (A) and JP 2-160602 (A). Japanese Patent Document JP 4-338101 (A), is used especially for starting the system, and Japanese Patent Documents JP 4-160003 (A) and JP 2-160602 (A), is additionally used for the reforming reaction in the reforming reaction space while heat is additionally generated by a partial oxidation reaction.

In the fuel cell system described in U.S. Pat. Document U.S. Pat. No. 5,248,566, the fuel cells are fed by hydrogen on the anode side. This hydrogen is generated by a partially oxidizing reforming reactor, the anode exhaust gas of the fuel cells is burned in an afterburner while feeding air. The resulting generated heat is used for heating the interior of a motor vehicle which is equipped with the fuel cell system.

Special cold starting measures were also suggested for systems for the water vapor reforming of a hydrocarbon without the use of a hydrogen separating stage. U.S. Pat. Documents U.S. Pat. No. 4,820,594 and U.S. Pat. No. 5,110,559 describe systems for water vapor reforming hydrocarbon in which a burner is integrated in the reforming reactor. The reforming reactor is in thermal contact with the reaction space of the reactor by way of a heat-conducting partition. During cold start, a combustible mixture is burned in this burner at an open flame. In U.S. Patent Document U.S. Pat. No. 5,110,559 the flame originates from the reforming reactor itself, the combustible hydrocarbon to be reformed being fed to the reaction space during the cold start. The hot combustion exhaust gases of the burner integrated in the reactor are guided into a CO shift converter connected in order to heat it and in this manner bring the system to the operating temperature more quickly.

A problem occurs, however, when the process of partial oxidation of the hydrocarbon, i.e., the POX process, is used in connection with a selectively hydrogen-separating member. A sufficiently high operating pressure, typically above 10 bar at the membrane, is required for achieving a sufficient hydrogen diffusion capacity. Simultaneously the POX process requires an oxygen-containing gas, such as air, which must therefore be compressed to the membrane operating pressure, which leads to correspondingly higher costs.

The present invention addresses the technical problem described above by providing a process and a system for the water vapor reforming wherein the system components reach their operating temperature as quickly as possible during a cold start at relatively low cost. Hydrogen can be provided correspondingly rapidly and can optionally be used in fuel cells. The present invention is also directed to a fuel cell system operating process of the initially mentioned type.

By means of the process according to the invention, during a cold start, the reforming system can be brought comparatively rapidly to its normal warmed-up operating condition without major expenditures. A heating operation is carried out wherein first the reforming reactor, which can be designed for POX operation as well as for water vapor reforming is operated at a relatively low pressure in a POX operation. The exothermal POX process generates heat, which, depending on the system construction, is transported via a direct solid-state heat conduction and/or by product gas generated during the partial oxidation as a heat carrier medium into the hydrogen separating stage and heats the membrane there. The product gas emerging from the reactor which, because of partial oxidation of the hydrocarbon, already contains hydrogen, is then transmitted from the hydrogen separating stage to the catalytic burner device and is catalytically burned there. Since the burner device is in thermal contact at least with an evaporator and the reforming reactor, these system components are also rapidly heated. Although supplementary heating measures may be provided, such as electric heating of the evaporator, the reforming reactor and/or the hydrogen separating stage, or directly feeding a catalytically combustible mixture into the catalytic burner device, this is not absolutely necessary.

When at least the reforming reactor has reached a normal, heated operating temperature, used in normal operation during the water vapor reforming, a second operating phase of the heating operation begins. The POX process is stopped and the system is run up to the normal operating pressure of, for example, between 10 bar and 40 bar required for the hydrogen-separating membrane. Simultaneously, water and the hydrocarbon to be reformed are fed into the evaporator and their evaporation is started in order to feed the forming mixture to the reactor and to reform the hydrocarbon. With the increased operating pressure and the continuously rising membrane temperature, the membrane becomes increasingly permeable for hydrogen. When used in a fuel-cell-operated motor vehicle, the system will already be supplied with hydrogen by this point in time that, by means of this hydrogen, unlimited driving operation is possible by means of the power of the fuel cell system.

According to one embodiment of the present invention, the membrane is heated not only by product gas guided through the hydrogen separating stage but also by a catalytic combustion activated in the hydrogen separating stage itself or in a part of the catalytic burner device which is in thermal contact with the hydrogen separating stage. As a result, the membrane will reach its normal operating temperature even faster. This process is particularly suitable for operating the system using a intermediate supply of air and hydrogen.

In another embodiment of the present invention, electrically generated heat is fed to the reforming reactor for a short time at the start of the first operating phase. This promotes fast starting of the POX operation of the reactor.

In another embodiment of the present invention, in the first operating phase of the heating operation, the combustion exhaust gas of the catalytic burner device is guided through the evaporator and/or the membrane so that these components are heated even faster and reach their normal operating temperature. The additional membrane heating can be implemented particularly by means of heating ducts.

In another embodiment of the present invention, the hydrocarbon which is subsequently reformed, is fed during the heating operation directly into the catalytic burner device for the purpose of a catalytic combustion. As a result, the catalytic burner device is capable of heating the reforming reactor and/or the evaporator and/or the hydrogen separating stage during time periods where no corresponding hydrogen from the POX operation of the reforming reactor has yet been fed to the catalytic burner device. This occurs, for example, because a sufficient amount of hydrogen has not yet been generated or because considerable amounts of hydrogen are already diffusing through the membrane and are used for different purposes.

In another embodiment of the present invention, at least one intermediate feeding conduit or fuel feeding pipe is provided so that water can be metered and fed into the reforming reactor. This fuel may be similarly fed into the hydrogen separating stage and/or into the catalytic burner device in order to operate as a heat transport medium and simultaneously avoid an overheating.

In a further embodiment of the present invention, the process may be used for a system with a multi-part catalytic burner device which has at least one burner part for the reforming reactor and a burner part for the evaporator. According to this process, oxygen-containing gas can be fed individually to different burner parts so that the chemical combustion energy of directly fed fuel or of the product gas coming from the reforming reactor and fed into the catalytic burner device can be distributed in a targeted manner to the individual burner parts.

In a further embodiment of the invention during the heating operation, the evaporator end the reforming reactor are heated to a temperature which is above the normal operating temperature in order to bring the system as a whole faster to normal operating conditions, and particularly be able to more rapidly heat the hydrogen separating stage.

In another embodiment of the invention, fuel cell system operating process is particularly suitable for use in fuel-cell-operated motor vehicles. In this case, the hydrogen generated by the reforming process is used as fuel for the fuel cells. The hot combustion exhaust gas of the catalytic burner device is used for heating a cooling circulation system of the fuel cell system.

Other objects, advantages and novel features of the present invention will become apparent from the following detailed description of the invention when considered in conjunction with the accompanying drawings.

BRIEF DESCRIPTION OF THE DRAWINGS

Advantageous embodiments of the invention are illustrated in the drawings and will be described as follows.

DETAILED DESCRIPTION OF THE DRAWINGS

Figure 1:
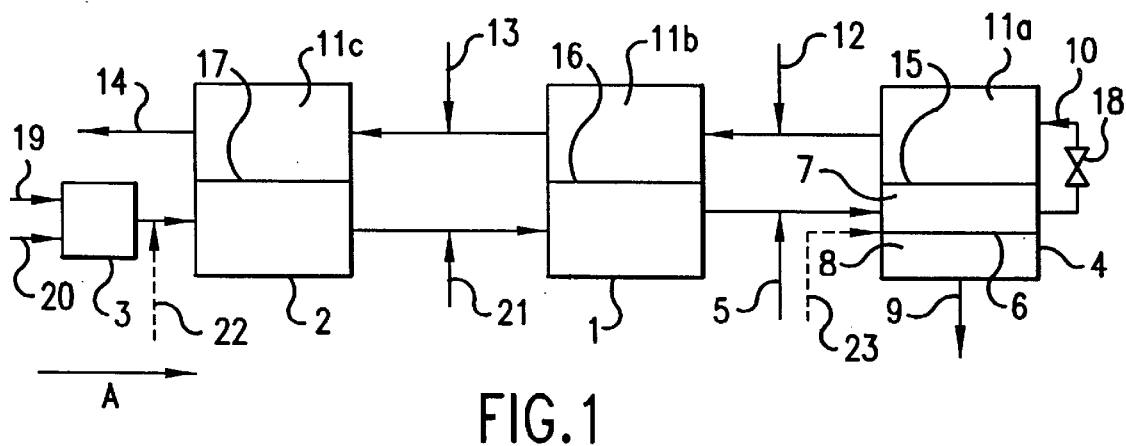
FIG. 1 is a block diagram of a water vapor reforming system.

The system illustrated in FIG. 1 is suitable, for example, for water vapor reforming methanol in a mobile application in a fuel-cell-operated motor vehicle in order to provide the hydrogen required for the fuel cells. The system contains a reforming reactor 1. Depending on the fed substances and the operating parameters, reforming reactor 1 may be operated in a POX operation wherein a fed hydrocarbon is partially oxidized exothermally while forming hydrogen. Alternatively reforming reactor 1 may be operated in a reforming operation wherein the hydrocarbon endothermally reacts with water forming hydrogen, and, for this purpose, contains a suitable catalyst material, such as a Cu/ZnO material.

An evaporator 2 is connected to an inlet end of reforming reactor 1. Water and methanol can be fed by means of a corresponding metering device 3 into evaporated 2. Water and methanol are taken in liquid form from corresponding storage tanks, which are carried on the vehicle and are not shown. They are fed to the metering device 3 by way of respective feeding pipes 19, 20.

A first intermediate feeding pipe 21 leads into a connection pipe between the evaporator 2 and the reforming reactor 1. In the gas flow direction illustrated by arrow A, an outlet end of, the reforming reactor 1 is adjoined by an inlet side of hydrogen separating stage 4. A second intermediate feeding pipe 5 leads to the respective connection pipe between reforming reactor 1 and hydrogen separating stage 4.

The hydrogen separating stage 4 contains a selectively hydrogen-permeable membrane 6 which divides the interior of the hydrogen separating stage 4 into a gas passage space 7 and a hydrogen withdrawal space 8. The substance mixture coming from the reactor 1 is introduced into the gas passage space 7 by way of a corresponding inlet. To the extent that this substance mixture contains hydrogen, depending on the operating condition of the membrane 6, the hydrogen diffuses at least partially through the membrane 6 into the hydrogen withdrawal space 8. The hydrogen is removed by way of a withdrawal pipe 9 and can be fed, for example, to the anode part of a fuel cell system. Furthermore, the substance mixture exits the gas passage space 7 by way of a corresponding outlet and arrives in a connected burner connection pipe 10. A pressure maintaining valve 18 is situated in the burner connection pipe 10.

Downstream of the pressure maintaining valve 18, the burner connection pipe 10 leads into a first part 11a of a three-part catalytic burner device 11a, 11b, 11c. The three burner parts 11a, 11b, 11c are serially connected. A first fuel feeding pipe 12 is provided between the first and the second part 11a, 11b respectively. A second fuel feeding pipe 13 is provided between the second and the third part 11b, 11c respectively. The combustion exhaust gas is discharged from the third burner part 11c, by an exhaust pipe 14. Optionally, combustion exhaust gas from the exhaust pipe 14 may be fed into a heating fluid pipe 22 provided on the inlet side of the evaporator 2. The combustion exhaust gas from exhaust pipe 14 may also be fed into a heating fluid pipe 23 provided on the inlet side of a heating duct system of the hydrogen separating membrane 6. Heat fluid pipes 22 and 23 are indicated by a broken line in FIG. 1. In this manner, the hot combustion exhaust gas can be led through the evaporator 2 and/or through the heating duct system of the membrane 6 in order to heat the evaporator 2 and the membrane more rapidly. The first burner part 11a is in thermal contact with the hydrogen separating stage 4 by way of a first heat-conducting partition 15. The second burner part 11b is in thermal contact with the reforming reactor 1 by way of a second heat-conducting partition 16. The third burner part 11c is in thermal contact with the evaporator 2 by way of a third heat-conducting partition 17.

Figure 2:
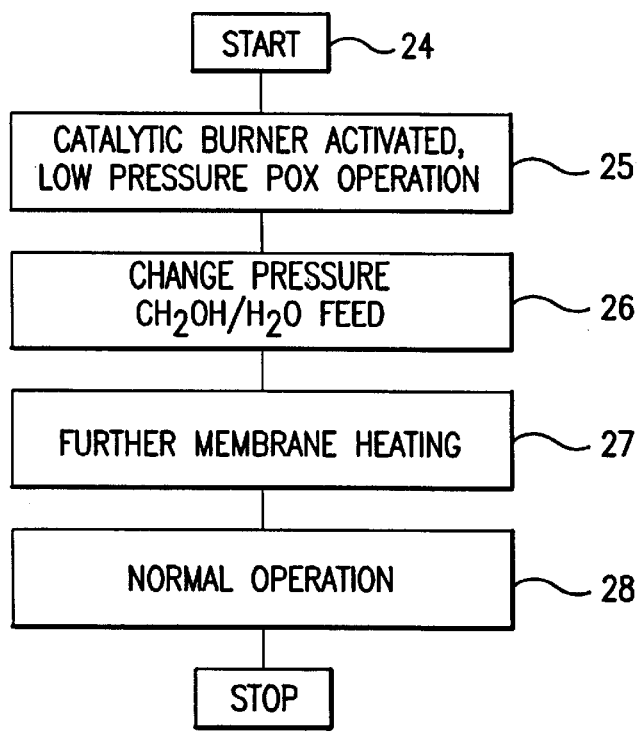
FIG. 2 is a flow chart of an operating process suitable for the system of FIG. 1.

In the system described above, during cold start, the system can be brought very rapidly to its normal operation condition by a corresponding heat operating process. The system components have reached their respective normal operating condition, particularly the increased temperature required for the water vapor reforming and the increased operating pressure additionally required for the essentially complete hydrogen diffusion through the membrane 6. A particularly advantageous embodiment of the inventive process is suitable for this purpose will be described below with reference to FIG. 2, in which important steps of this process are illustrated.

After triggering a cold start 24 of the motor vehicle and thus also of the reforming system, a heating operation is carried out. A first operating phase 25 comprises activating the catalytic burner device 11a, 11b, 11c and activating the reforming reactor 1 in a POX operating mode at a relatively low system pressure, for example, between 1 bar and 10 bar. To activate the POX operation in reforming reactor 1 liquid methanol stored for example in a vehicle tank, water and air are fed in suitable fractions to reactor 1 at the initial low system pressure the first intermediate feeding pipe 21. Simultaneously, and as required, liquid methanol, as fuel, and air as an oxidant, are fed through the two fuel feeding pipes 12, 13 into the corresponding parts 11b, 11c of the catalytic burning device. The methanol is catalytically burned in a flameless manner.

To avoid overheating, water can additionally be introduced into the fuel feeding pipes 12, 13 in a respective required quantity. As a result of the catalytic combustion process in the two burner parts 11b, 11c, the reactor 1 and the evaporator 2 are heated by the respective heat-conducting partition 16, 17. In addition, particularly at the beginning of the first operating phase electrically generated heat may be used to promote the start of the POX reaction in the reactor 1.

The reactor 1 will be capable of furnishing, after a few seconds, a hydrogen-containing product gas as the result of a partial methanol oxidation. This product gas is guided through the gas passage space 7 of the hydrogen separating stage 4 and heats the membrane 6 there. Because of the low system pressure, only a small amount of hydrogen is separated by the membrane 6 in this operating phase. If required, hydrogen can be fed as fuel into the catalytic burner device 11a, 11b, 11c in order to contribute to the combustion process there. The product gas arrives in the catalytic burner device, successively in the three burner parts 11a, 11b, 11c through the burner feeding pipe 10, whose pressure maintaining valve 18 is open in this operating phase at a low system pressure. The product gas catalytically burned there with air, which, for this purpose, together with water to protect against overheating and a heat carrier medium, is admixed by way of the second intermediate feeding pipe 5 to the product gas coming from the reactor 1. In this manner, the catalytic burner device 11a, 11b, 11c heats the reactor 1, the evaporator 2 and the hydrogen separating stage 4. The reactor 1 is additionally heating by means of the heat generated during the partial methanol oxidation.

According to the application, additional heat promoting measures may be implemented. If required, the hot combustion exhaust gas of the catalytic burner device 11a, 11b, 11c can be branched off the exhaust gas pipe 14 and led by way of the corresponding feeding pipes 22, 23 to the evaporator 2 and through this evaporator 2 and/or to the hydrogen separating membrane 6 and through heating ducts which may be provided therein. As a result, the hot combustion exhaust gas contributes to the heating of the evaporator 1 and of the membrane 6. In addition, when used in a fuel-cell-operated motor vehicle, the hot combustion exhaust gas can be used for heating a cooling circulation system of a fuel cell system. As a further heating measure, it may be provided that the product gas coming out of the reforming reactor 1 is at least partially catalytically burned in the hydrogen separating stage 4. As a result, the membrane 6 is heated more rapidly. When a Pd membrane is used, this membrane is already catalytically active in a suitable manner; otherwise, a suitable catalyst material can be provided as a coating of the membrane 6 or at a different point of the gas passage space 7, for example, as a layer or in bulk.

When at least the reforming reactor 1 and the evaporator 2 have reached an operating temperature suitable for beginning water vapor reforming, the POX process is stopped. In a subsequent second operating phase 26, the corresponding feeding of the reaction partners through the first feeding pipe 21, and the low-pressure air metering for the membrane 6 by way of the second intermediate feeding pipe 5 are terminated. Simultaneously, pressure maintaining valve 18 is closed and liquid methanol and water are now fed by the metering device 3 into the evaporator 2. The metering device 2 contains metering pumps for the liquid educts methanol and water, which are designed such that they are suitable for the subsequently desired increased operating pressure. This increased operating pressure which is required for the hydrogen diffusion function of the membrane 6 amounts typically to between 10 bar and 40 bar.

In the evaporator 2, the methanol and water are evaporated into a methanol/water vapor mixture which, as a preferably overheated mixture, arrives in the reforming reactor 1, where the methanol experiences water vapor reforming so that a hydrogen-rich reformate gas is formed. This reformate gas is fed to the hydrogen separating stage 4, where the membrane 6 becomes increasingly hydrogen-permeable with a rising temperature and an increasing membrane differential pressure. In addition, the reformate gas further heats the membrane 6.

As soon as the system has reached the increased normal operating pressure, in a third operating phase 27, at a normal operating pressure and a normal operating temperature of the remaining system components, the membrane 6 is further heated in order to achieve its optimal hydrogen permeability. In this third operating phase, the membrane 6 is already capable of separating an amount of hydrogen to permit unlimited driving operation when used in a fuel-operated motor vehicle.

During the entire heating operation for accelerating warm-up operation of the system, through the three above-mentioned operating phases 25, 26, 27, it may be provided, if required, to operate the evaporator 2 and/or the reforming reactor 1 at an increased temperature which is above the normal operating temperature used in the later normal operation. Although, more carbon monoxide is formed in the reactor 1 as a result, this is not damaging because it cannot diffuse through the membrane and is burned in the catalytic burning device 11a, 11b, 11c.

As soon as the membrane 6 has reached its operating condition with respect to the temperature and the differential pressure which is required for a complete hydrogen diffusion, the heating operation is concluded, and the system changes to its normal operation 28. In this case, the system generates a hydrogen-rich reformate gas in the reforming reactor 1 from a fed methanol/water vapor mixture. The formed hydrogen is selectively separated from the other reformate gas constituents by means of the hydrogen separating stage 4 and can be fed by way of the withdrawal pipe 9, for example, to a fuel cell system. The heating of individual system components is maintained as long as is necessary to maintain the optimal operating temperatures of the individual components. In this case, air metering and/or fuel metering for the individual parts 11a, 11b, 11c of the catalytic burner device, as well as during the heating operation, can be adjusted individually in order to maintain the reactor 1, the evaporator 2 and the hydrogen separating stage 4 at their respective optimal temperature.

The system will remain in the normal operation 28 until the vehicle is switched off. The system may then also be switched off (step 29) because, as the result of the described process, it can be rapidly started again. In the cold system condition to supply hydrogen within a very short time. This is particularly advantageous particularly for the mobile application in fuel-cell-operated motor vehicles because a fairly large intermediate hydrogen storage device is eliminated without requiring the reforming system to be maintained in an operative warmed-up condition when the vehicle is switched off.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for operating a system for water vapor reforming a hydrocarbon or hydrocarbon derivative, comprising an evaporator, a reforming reactor adapted to be used in a partial oxidation operation or for water vapor reforming, a hydrogen separating stage having a selectively hydrogen-permeable membrane, and a catalytic burner device in thermal contact with heat-conducting partitions with the evaporator and the reforming reactor, said process including a warmed normal operating condition and a cold start of the system, wherein when the system is in a warmed normal operating condition, the hydrocarbon or the hydrocarbon derivative is subjected to a water vapor reforming reaction in the reforming reactor to form a reformate gas containing hydrogen which is separated from the remaining reformate gas constituents in the hydrogen separating stage at a normal operating pressure and normal operating temperature; further wherein during the cold start of the system, a heating operation is carried out wherein during a first operating phase the reforming reactor is used in the partial oxidation operation at a heating operating pressure which is lower than the normal operating pressure to partially oxidize the hydrocarbon or the hydrocarbon derivative thereby forming a product gas, the product gas is fed through the hydrogen separating stage into the catalytic burner device and is catalytically burned therein with an oxygen-containing gas, and wherein during a subsequent second operating phase, the reforming reactor is used for the water vapor reforming operation and pressure therein is increased from the heating operating pressure to the normal operating pressure.

2. A process according to claim 1, further wherein during the heating operation, the membrane is additionally heated by a catalytic combustion activated in the hydrogen separating stage of at least part of the product gas fed there through or by a part of the catalytic burner device which is in thermal contact therewith.

3. A process according to claim 1, further wherein at the beginning of the first operating phase, electrically generated heat is fed for a short time to the reforming reactor to start the partial oxidation operation.

4. A process according to claim 1, further wherein during the first operating phase combustion exhaust gas from the catalytic burner device is fed through the evaporator and/or through heating ducts of the membrane.

5. A process according to claim 1, further wherein during the heating operation, the hydrocarbon or the hydrocarbon derivative is fed directly into the catalytic burner device for the catalytic combustion.

6. A process according to claim 1, further wherein water being used as a heat transport medium and for avoiding an overheating is metered into the reforming reactor and/or into the hydrogen separating stage and/or into the catalytic burner device by way of at least one intermediate feeding pipe.

7. A process according to claim 1, further wherein the catalytic burner device has at least two parts with at least one burner part assigned to the reforming reactor and at least one burner part assigned to the evaporator, and oxygen-containing gas is fed individually to the respective burner parts.

8. A process according to claim 1, further wherein the evaporator and the reforming reactor are operated during the heating operation at a temperature above the normal operating temperature.

9. A process for operating a system for water vapor reforming a hydrocarbon or hydrocarbon derivative, wherein said process comprises a cold start of the system and a normal operating condition, comprising:

(A) during the cold start of the system:
  partially oxidizing a hydrocarbon or a hydrocarbon derivative in a reforming reactor thereby forming a product gas;
  feeding the product gas through a hydrogen separating stage having a selectively hydrogen-permeable membrane, thereby heating the hydrogen-permeable membrane;
  feeding the product gas into a catalytic burner device, wherein the catalytic burner device is in thermal contact with at least one of an evaporator the reforming reactor, or the hydrogen separating stage via a heat-conducting partition;
  catalytically burning the product gas with an oxygen-containing gas in the catalytic burner device, thereby heating the evaporator and the reforming reactor to a normal operating condition; and (B) during the normal operating condition:
  increasing pressure in the system;
  water vapor reforming the hydrocarbon or hydrocarbon derivative in the reforming reactor to form a reformate gas containing hydrogen; and
  separating the hydrogen from the reformate gas in the hydrogen separating stage.

* * * * *